Aug. 8, 1933.  W. A. SPEAR  1,921,847
SYNCHRONOUS MOTOR CLOCK
Filed Aug. 11, 1930
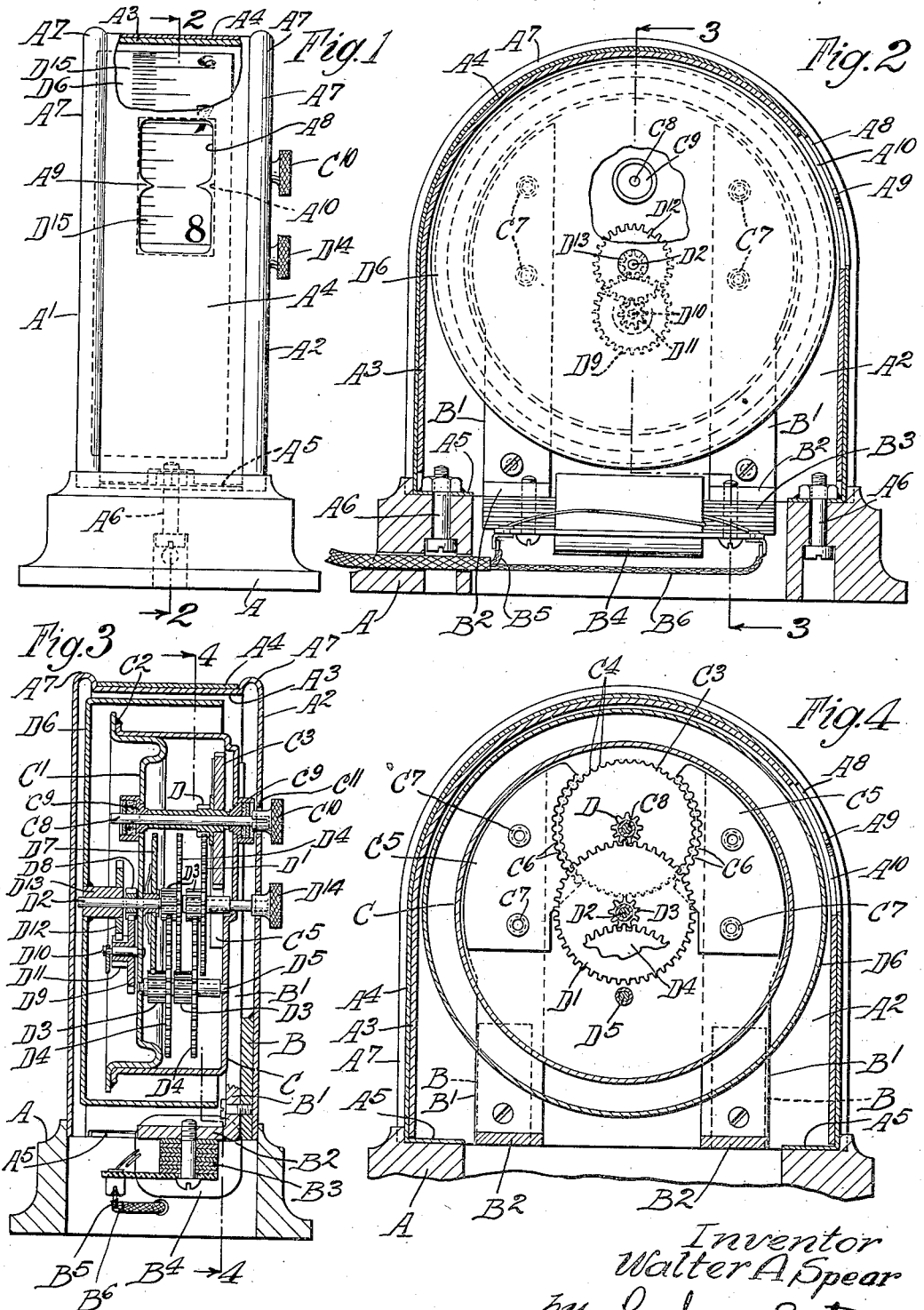
Inventor
Walter A Spear
by Parker & Carter
Attorneys.

Patented Aug. 8, 1933

1,921,847

UNITED STATES PATENT OFFICE 1,921,847

SYNCHRONOUS MOTOR CLOCK

Walter A. Spear, Cincinnati, Ohio, assignor, by mesne assignments, to Victor Electric Products, Inc., Cincinnati, Ohio, a Corporation of Ohio Application August 11, 1930. Serial No. 474,398

10 Claims. (Cl. 58—125)

My invention relates to a synchronous motor or alternating current clock, and has for one object the provision of a clock which may be operated by a synchronous motor in circuit with a commercial source or supply of alternating current. One object of my invention is the provision of such a clock which shall be sightly and compact, which shall take up a small space, for example, upon a desk. Another object is the provision of such a clock in which a narrow case or housing may be employed. Another object is the provision of improved time indicating means. Other objects will appear from time to time in the course of the specification and claims.

I illustrate my invention more or less diagrammatically in the accompanying drawing, wherein—

Figure 1 is a front elevation with parts broken away;

Figure 2 is a section on the line 2—2 of Figure 1;

Figure 3 is a section on the line 3—3 of Figure 2; and

Figure 4 is a section on the line 4—4 of Figure 3.

Like parts are indicated by like symbols throughout the specification and drawing.

Referring to the drawing, A generally indicates a clock base, on which may be mounted a housing structure which includes side panels $A^1$ $A^2$, connected by an arcuate intermediate wall. Overlying said wall is a front and rear panel or strip $A^4$, having inturned ends $A^5$ which may be secured to the base, as by the bolts $A^6$. It will be understood that the surrounding strip $A^4$ clamps the housing structure which includes the panels $A^1$ $A^2$ and arcuate wall $A^3$ upon the base A. I illustrate the edges of the panels $A^1$ $A^2$ as rolled over as at $A^7$ which project beyond the edges of the strip $A^4$. $A^8$ is an indicating aperture in one side of the panel $A^1$, the edges of which are formed as indicating fingers, as at $A^9$. An aperture $A^{10}$ in the wall $A^3$ is in register with the aperture $A^8$.

Positioned on the inner face of the panel $A^2$ are a plurality of relatively thick plates B, to which may be secured combined pole pieces and clock supports $B^1$, the pole pieces being provided with angles or outwardly projecting offsets $B^2$ at their lower ends, connected by the laminated member $B^3$, about which is the coil $B^4$ in circuit as by conductive lines $B^5$ $B^6$ with any suitable source of alternating current.

Secured to the upper ends of the pole pieces $B^1$ is an oil-tight housing, including the housing or cup member C and a lid or front $C^1$ therefor, the edges of the members C and $C^1$ being secured together, for example soldered, as at $C^2$. Positioned within the housing C is the rotor proper $C^3$ of the synchronous motor clock. This rotor being indicated as having a plurality of teeth $C^4$ opposed to teeth $C^6$ on the pole pieces $C^5$ secured to and in effect forming part of the pole pieces $B^1$. The inner pole pieces $C^5$ are positioned inside of the housing C, which are connected to the exterior pole pieces, for example by bolts or rivets $C^7$. The relation of the inner pole pieces $C^5$ and the rotor $C^3$ will be clear from Figure 4. The rotor $C^3$ is mounted on a shaft $C^8$ rotating in suitable bearings $C^9$ and terminating, exteriorly of the housing C, in a knurled knob $C^{10}$. This knob is positioned exteriorally of the panel $A^2$, the panel being apertured as at $C^{11}$ to permit its passage therethrough.

D is a pinion on the rod $C^8$ in mesh with a gear $D^1$ on the shaft $D^2$. The details of the clock mechanism or train of gears herein shown do not of themselves form part of the present invention, but it will be understood that through the train of gears, including the pinion D, the gear $D^1$ and other pinions $D^3$ and gears $D^4$ on the shafts $D^2$ and $D^5$ respectively, rotation of the rotor $C^3$ and the shaft $C^8$ effects rotation of the drum $D^6$. The gears $D^4$ and associated pinions $D^3$ are loosely mounted upon the shafts $D^2$ $D^5$. In mesh with one of the pinions $D^3$ upon the shaft $D^5$ is the gear $D^7$ fixed in relation with the shaft $D^2$. Mounted for rotation with the shaft $D^2$ exterior of the housing C is the driving pinion $D^8$ in mesh with the gear $D^9$ upon the stub shaft $D^{10}$. The final driving connection is through the associated pinion $D^{11}$ meshing with the gear $D^{12}$ fixed in relation to the sleeve $D^{13}$ which serves to support and center the drum $D^6$ and fix its axis of rotation. The sleeve $D^{13}$ is mounted upon and free to rotate independently of rotation of the shaft $D^2$. The shaft $D^2$ is also provided with an exterior knob $D^{14}$, whereby a more rapid rotation of the drum may be provided than is obtained through the normal rotation of the rotor $C^3$. This permits the setting of the drum at any desired position, and thus permits setting of the time indicating means, when correction is necessary.

It will be realized that whereas I have described and shown a practical and operative device, nevertheless many changes may be made in size, shape, number and distribution of parts.

I therefore wish my drawing and description to be taken as in a broad sense illustrative and diagrammatic, rather than as limiting me to the precise features and limitations herein described and shown. In particular I wish it to be understood that the precise details of the synchronous motor herein shown do not of themselves form part of the present invention, and I do not wish my present invention to be limited to use with a synchronous motor clock, or to use with the particular motor shown.

The use and operation of my invention are as follows:

The coil $B^4$, being in circuit with commercially supplied alternating current, the alternation of the current through the pole pieces $B^1$ and $C^5$ causes a rotation of the rotor $C^3$ and the shaft $C^8$ in step with the alternating current supply. This rotation of the rotor $C^3$ and shaft $C^8$ causes a rotation of the drum $D^6$. Rotation of the drum causes movement of the time indicating symbol $D^{15}$ in line with the aperture $A^8$ and past the indicating fingers $A^9$. Assuming that the drum may be marked to indicate the passage of twelve hours, the device may be geared to cause one complete rotation of the drum every twelve hours. However, with approximate marking, the drum may be caused to complete its rotation within a shorter or a longer period of time than twelve hours, depending upon the lapse of time to be indicated. The alternating current motor may be launched, for example, by manual rotation of the knob $C^{10}$, and if launched at a speed approximately that or somewhat greater than synchronous, it will continue rotation indefinitely unless and until the circuit through the coil $B^4$ is interrupted or broken. In order to set the drum, for example to compensate a stoppage of the clock, the operator rotates a knob $D^{14}$ which effects a rather rapid rotation of the drum and permits it to be readily set.

One important advantage of my device is its compactness. The outer casing, including the panels $A^1$ and $A^2$ and the strip $A^4$, conforms closely in form and in size to the drum $D^6$ which rotates therewithin. The train of gears and the rotor which drives the drum are housed in a substantial oil proof container or casing, including the members $C$ and $C^1$, which in turn are positioned within the drum. The relatively bulky coil is positioned directly beneath the drum within the base. Thus there is no waste of space and a clock case of small volume and of convenient shape is provided.

By reading time from the side of a narrow drum rather than from a circular clock face, I permit the employment of a very narrow case, but without the sacrifice of readily readable figures, as the figures and the indicating markers are as large, or even larger than those of a clock having a large face. My clock is particularly adapted for use in a narrow space, or for use in positions and under conditions where a small clock or clock case is advantageous.

I claim:

1. In an alternating current electric clock, of the type including a clock base, a housing positioned upon said base, a drum mounted for rotation within said housing, the exterior of said drum being provided with time indicating markers, said housing being apertured in line with said drum and markers, and means for rotating the drum, including a train of gears positioned interiorly of said drum, and an alternating current motor adapted to drive said train of gears, the combination with said drum rotating means of a substantially oil tight inner housing, positioned within said drum, in which the gear train and motor rotor are housed.

2. In a clock of the type including, a time indicating drum having on the periphery thereof time indicating markings, a clock housing surrounding said drum and conforming closely to the exterior thereof, said housing including an opening in line with said drum, through which the indicating markings may be seen, and a chain of gears for driving said drum, the combination with said chain of gears of an alternating current motor for driving the same, the rotor of which is positioned within said drum, and pole pieces for said motor, said pole pieces being fixed in relation to the clock housing, the chain of gears and rotor being supported upon said pole pieces.

3. In a clock of the type including, a time indicating drum having one side closed and one side open, time indicating markings about the periphery of the drum, a clock housing surrounding said drum and conforming closely to the exterior thereof, and means for rotating said drum including an alternating current motor the pole pieces of which extend upwardly within a side of the housing adjacent the open side of the drum, the combination with said pole pieces of an inner housing mounted thereon, the rotor of the alternating current motor being rotatably positioned within said inner housing, a train of gears positioned within said housing, and a driving connection between said gears and the drum.

4. In a clock of the type including, a time indicating drum having one side closed and one side open, time indicating markings about the periphery of the drum, a clock housing surrounding said drum and conforming closely to the exterior thereof, and means for rotating said drum including an alternating current motor the pole pieces of which extend upwardly within a side of the housing adjacent the open side of the drum, the combination with said pole pieces of an inner housing mounted thereon, the rotor of the alternating current motor being rotatably positioned within said inner housing, a train of gears positioned within said housing, and a driving connection between said gears and the drum, said drum being rotatably mounted upon said housing.

5. In a synchronous motor clock, a clock base, pole pieces for said synchronous motor extending upwardly from said base, a housing positioned upon said pole pieces, a rotor for said synchronous motor, positioned within said housing, a gear train within said housing, adapted to be actuated by said rotor, a time indicating drum rotatably supported in relation to said housing and a driving connection between said gear train and said drum, said drum including an open side and a closed side, and being adapted, when mounted upon said housing, to surround and enclose the housing.

6. In a synchronous motor clock, a clock base, pole pieces for said synchronous motor extending upwardly from said base, a housing positioned upon said pole pieces, a rotor for said synchronous motor, positioned within said housing, a gear train within said housing, adapted to be actuated by said rotor, including a shaft an end of which projects through a side of said housing, a pinion thereupon, a time indicating drum rotatably mounted upon said shaft and a driving connection between said drum and said pinion.

7. In a synchronous motor clock, a clock base, pole pieces for said synchronous motor extending upwardly from said base, a housing positioned upon said pole pieces, a rotor for said synchronous motor, positioned within said housing, a gear train within said housing, adapted to be actuated by said rotor, including a shaft an end of which projects through a side of said housing, a pinion thereupon, a time indicating drum rotatably mounted upon said shaft and a driving connection between said drum and said pinion, and an exterior manually engageable reset member positioned upon the opposite end of said shaft.

8. In an alternating current clock, a housing including a pair of generally parallel and closely adjacent sides, a base, an inner housing positioned between said sides, a rotor within said housing, pole pieces in cooperative relation with said rotor, said inner housing being mounted on said pole pieces, a train of gears in said inner housing adapted to be rotated by said rotor, a drum rotatably mounted upon and surrounding said inner housing, and a driving connection between said drum and said train of gears, said parallel sides being connected by an arcuate housing member conforming closely to the exterior of the drum, and apertured in line with the cylindrical face of the drum, said drum face being provided with time indicating markings.

9. In a clock, a base, a housing including flat parallel side members upstanding from said base, and a transversely extending wall member joining said side members, the upper portions of said side members and said transversely extending wall member being arcuate, and a securing member, the ends of which engage said base, the intermediate portion of which extends about and conforms to said transversely extending wall member of the housing and means for securing the ends of said member to the base.

10. In a clock, a base member, a housing mounted upon the base and including spaced parallel side members upstanding from the base and a transversely extending wall member joining said side members, and means for securing the housing to said base including a strap member embracing the housing and secured at its ends to said base, said housing and strap being provided with aligned apertures for exhibiting the indicating mechanism positioned within the housing.

WALTER A. SPEAR.